United States Patent [19]
Anderson

[11] Patent Number: 6,020,920
[45] Date of Patent: Feb. 1, 2000

[54] METHOD AND SYSTEM FOR SPECULATIVE DECOMPRESSION OF COMPRESSED IMAGE DATA IN AN IMAGE CAPTURE UNIT

[75] Inventor: Eric C. Anderson, San Jose, Calif.

[73] Assignee: FlashPoint Technology, Inc., San Jose, Calif.

[21] Appl. No.: 08/872,588

[22] Filed: Jun. 10, 1997

[51] Int. Cl.[7] .................................................. H04N 5/228
[52] U.S. Cl. ........................... 348/222; 348/220; 348/231
[58] Field of Search ..................................... 348/207, 220, 348/222, 223, 231, 239, 333, 334, 552, 348, 445; 386/27, 109, 117; 345/202, 507, 509, 129, 146; 395/872, 157

[56] References Cited

U.S. PATENT DOCUMENTS

| | | |
|---|---|---|
| 5,016,107 | 5/1991 | Sasson et al. . |
| 5,164,831 | 11/1992 | Kuchta et al. . |
| 5,341,466 | 8/1994 | Perlin et al. . |
| 5,345,552 | 9/1994 | Brown ...................................... 345/119 |
| 5,414,811 | 5/1995 | Parulski et al. . |
| 5,434,969 | 7/1995 | Heilveil et al. . |
| 5,493,335 | 2/1996 | Parulski et al. . |
| 5,521,717 | 5/1996 | Maeda . |
| 5,528,293 | 6/1996 | Watanabe . |
| 5,576,757 | 11/1996 | Roberts et al. . |
| 5,706,097 | 1/1998 | Schelling et al. . |
| 5,706,457 | 1/1998 | Dwyer et al. . |
| 5,724,579 | 3/1998 | Suzuki . |
| 5,757,418 | 5/1998 | Inagaki ...................................... 348/15 |
| 5,761,655 | 6/1998 | Hoffman . |

*Primary Examiner*—Tuan Ho
*Attorney, Agent, or Firm*—Sawyer & Associates

[57] ABSTRACT

A method and system is disclosed for accelerating a user interface on a display of an image capture unit. The image capture unit includes a plurality of image files for providing a plurality of images. In a first aspect, the method and system comprise selecting an image based upon a scrolling method and providing a predetermined number of speculation buffers. The method and system include organizing the predetermined number of speculation buffers based upon the selected image so as to assign each of the predetermined number of speculation buffers to store one of the plurality of images in response to the scrolling method. In a second aspect, the image capture unit operates in a plurality of modes The image capture unit also includes a plurality of input buffers which are utilized in one of the plurality of modes and are unutilized on at least one of the other of the plurality of modes. The method and system in accordance with this aspect comprise reallocating the input buffers as speculation buffers and providing image data from the image files to the speculation buffers when the image capture unit is in the at least one of the plurality of modes.

7 Claims, 17 Drawing Sheets

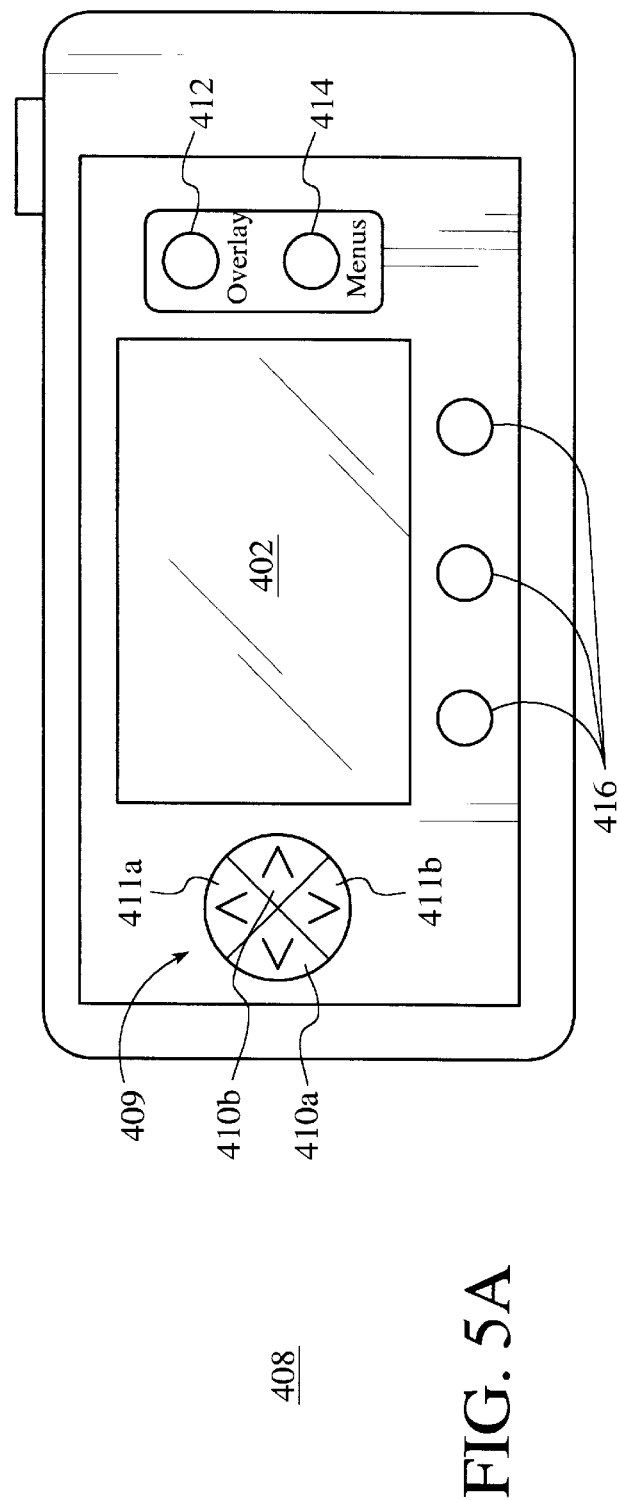
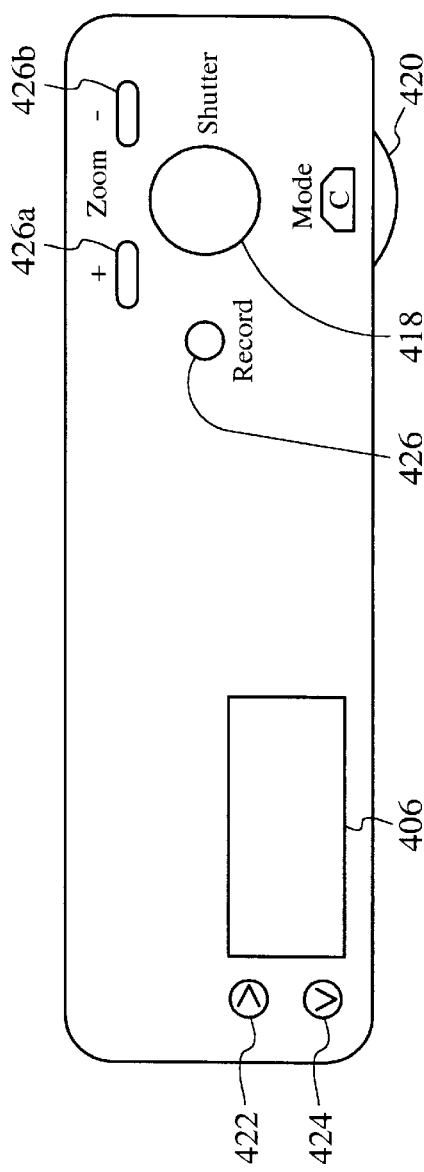
FIG. 5A
FIG. 5B

METHOD AND SYSTEM FOR SPECULATIVE DECOMPRESSION OF COMPRESSED IMAGE DATA IN AN IMAGE CAPTURE UNIT

CROSS-REFERENCE TO RELATED APPLICATIONS

The present invention is related to the following co-pending U.S. patent application Ser. No. 08/872,651 entitled "A Method And System For Generating An Enhanced Image File In An Image Capture Unit"; Ser. No. 08/872,587 entitled "A Method And System For Accelerating A User Interface of An Image Capture Unit During Review Mode"; and Ser. No. 08/872,578 entitled "A Method And System For Accelerating A User Interface of an Image Capture Unit During Play Mode," which are assigned to the assignee of the present application and filed on the same date as the present application.

FIELD OF THE INVENTION

The present invention relates generally to an image capture unit and more particularly to a method and system for accelerating a user interface in such a unit.

BACKGROUND OF THE INVENTION

Modern digital cameras for taking pictures of scenes and the like typically include an imaging device which is controlled by a computer running a single threaded process. When an image is captured, the imaging device is exposed to light and generates raw image data representing the image. The raw image data is typically stored in a single image buffer where it is then processed and compressed by the processor. Many types of compression schemes are used to compress the image data, with the joint photographic expert group (JPEG) standard being the most popular. After the processor processes and compresses the raw image data into JPEG image files, the processor stores the JPEG image files into an internal memory or on an external memory card.

Some digital cameras are also equipped with a liquid-crystal display (LCD) or other type of display screen on the back of the camera. Through the use of the LCD, the processor can cause the digital camera to operate in one of two modes, record and play, although some cameras only have a record mode. In record mode, the LCD is used as a viewfinder in which the user may view an object or scene before taking a picture. In play mode, the LCD is used a playback screen for allowing the user to review previously captured images either individually or in arrays of four, nine, or sixteen images.

Besides the LCD, digital camera user interfaces also include a number of buttons or switches for setting the camera into one of the two modes and for navigating between images in play mode. For example, most digital cameras include two buttons labeled "−" and "+" that enable a user to navigate or scroll through captured images. For example, if the user is reviewing images individually, meaning that single images are displayed full-sized in the LCD, pressing one of navigation buttons causes the currently displayed image to be replaced by the next image.

To display a captured image in play mode, the processor must first access the JPEG image file corresponding to the captured image from memory, decompress the image data sixteen horizontal lines at time, and then send the decompressed data to the LCD. When the user presses the navigation button to see the next image, the user sees the next image slowly replace the previously displayed image from top to bottom. Due to the amount of processing involved, the display of the entire image may take several seconds in some cameras. Not only is the image decompression time slow, but conventional digital cameras also do not allow other camera operations while the JPEG image is being decompressed, which means that the user cannot abort the decompression process. Thus, if the user decides halfway through reviewing a current image that another image is preferred, the camera will not recognize the next action until the current image is fully displayed.

Accordingly, a user interface of this type appears to the user as being slow and non-responsive when attempting to access multiple images on a digital camera. Speed of access to these images has become increasingly important as these types of cameras have become more widely available.

There is a need, therefore, to provide images on a display device which allows the user to review multiple captured images, while simultaneously providing a display and a readout for a particular image in an efficient and straightforward manner. It is similarly important to be able to rapidly identify a recognizable representation of the image. Finally, the system and method should be more responsive to the user than previously known systems. For example, in a plurality of captured images, it would be useful to quickly identify two or more particular images quickly, with a minimum of effort. It is also important to provide more efficient ways to quickly navigate through a series of images. The system should be implementable in a simple and cost effective fashion and should be easily handled by a user. The present invention addresses such a need.

SUMMARY OF THE INVENTION

A method and system is disclosed for accelerating a user interface on a display of an image capture unit. The image capture unit includes a plurality of image files for providing a plurality of images. In a first aspect, the method and system comprise selecting an image based upon a scrolling method and providing a predetermined number of speculation buffers. The method and system include organizing the predetermined number of speculation buffers based upon the selected image so as to assign each of the predetermined number of speculation buffers to store one of the plurality of images in response to the scrolling method.

In a second embodiment, the image capture unit operates in a plurality of modes. The image capture unit also includes a plurality of input buffers which are utilized in one of the plurality of modes and are unutilized on at least one of the other of the plurality of modes. The method and system in accordance with this aspect comprises reallocating the input buffers as speculation buffers and providing image data from the image files to the speculation buffers when the image capture unit is in the at least one of the plurality of modes.

BRIEF DESCRIPTION OF THE DRAWINGS

FIGS. 5A and 5B are diagrams depicting the back and top view, respectively, of a digital camera.

DETAILED DESCRIPTION OF THE INVENTION

The present invention relates to a method and system for accelerating the review and navigation through a series of images on an image capture unit. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any image capture device which displays images, icons and/or other items, could incorporate the features described hereinbelow and that device would be within the spirit and scope of the present invention. Thus, the present invention is not intended to be limited to the embodiment shown but is to be accorded the widest scope consistent with the principles and features described herein.

The present invention is a method and system for accelerating a graphical user interface of an image capture unit using expanded image files that allow for the rapid display of captured images.

Figure 1:
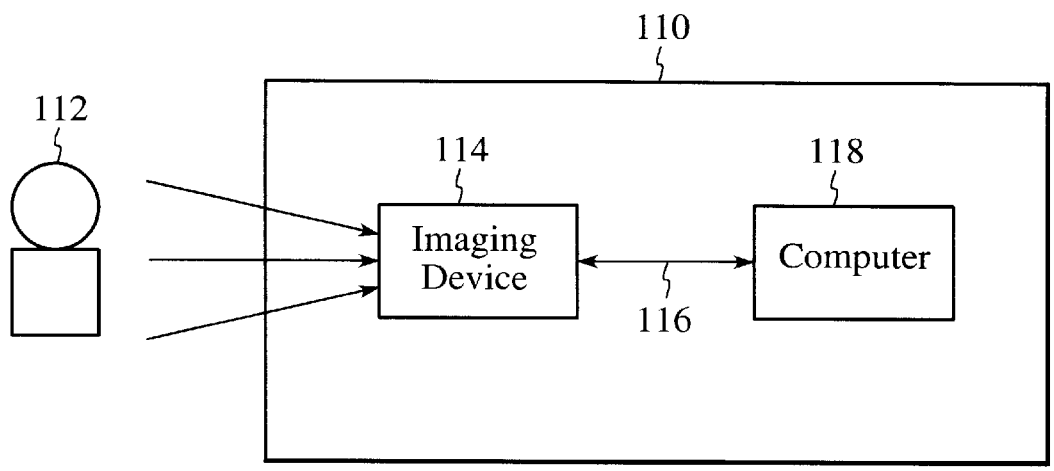
FIG. 1 is a block diagram of a digital camera that operates in accordance with the present invention.

Referring now to FIG. 1, a block diagram of a digital camera 110 is shown for use in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
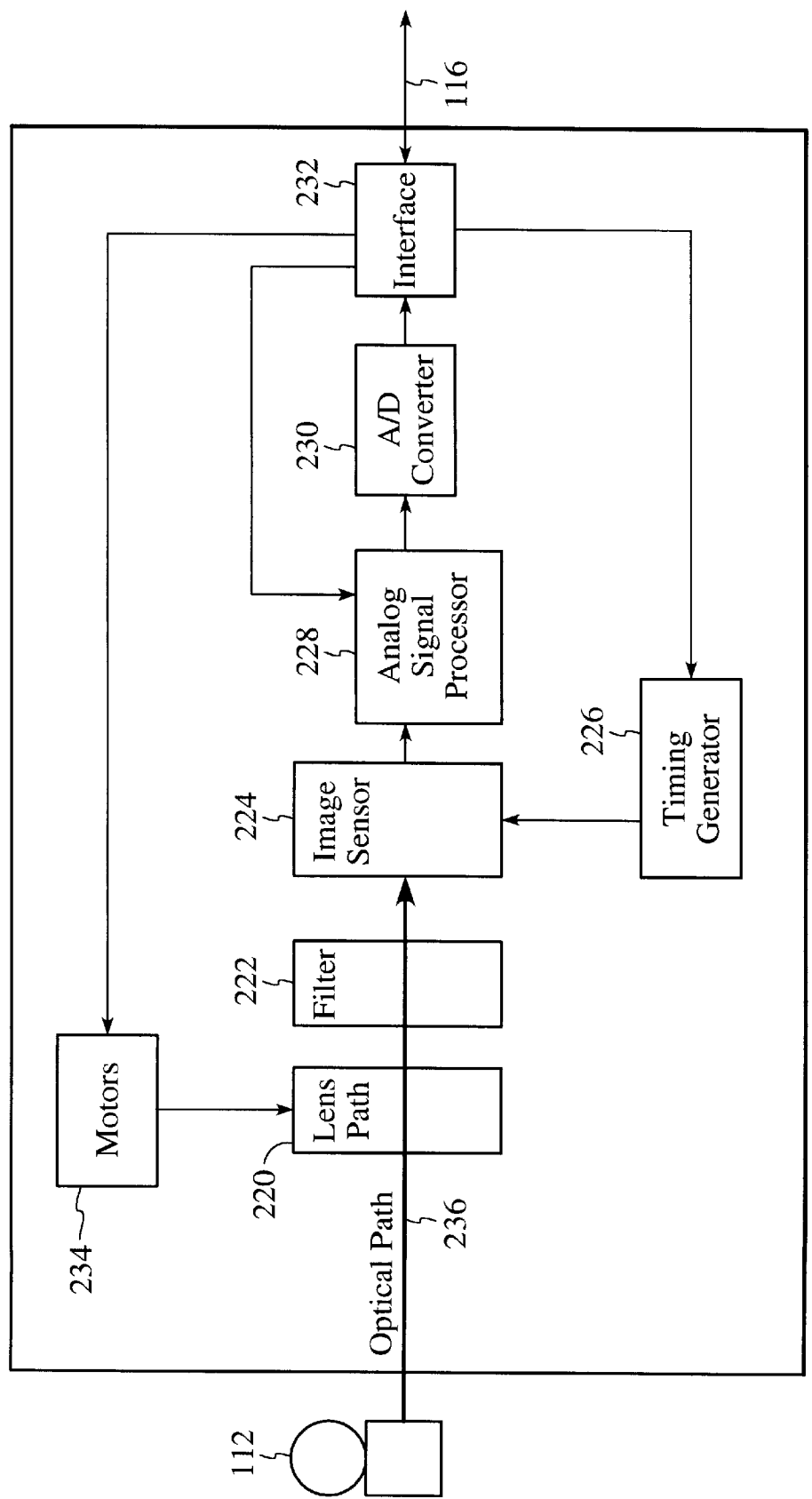
FIG. 2 is a block diagram of one preferred embodiment for the imaging device of FIG. 1.

Referring now to FIG. 2, a block diagram of one preferred embodiment of imaging device 114 is shown. Imaging device 114 typically comprises a lens 220 having an iris, a filter 222, an image sensor 224, a timing generator 226, an analog signal processor (ASP) 228, an analog-to-digital (AID) converter 230, an interface 232, and one or more motors 234.

In operation, imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
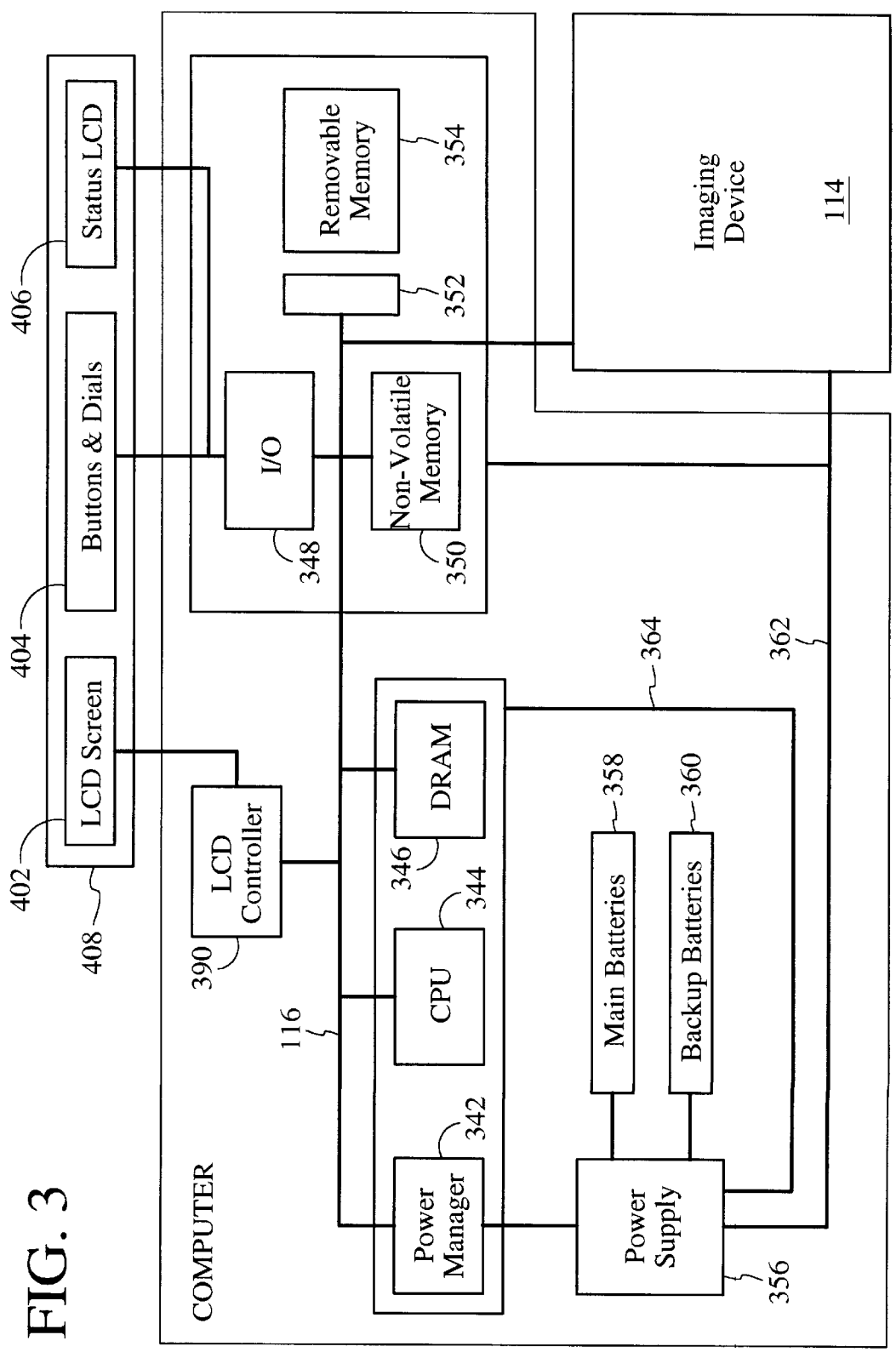
FIG. 3 is a block diagram of one preferred embodiment for the computer of FIG. 1.

Referring now to FIG. 3, a block diagram of one preferred embodiment for computer 118 is shown. System bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multithreaded environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk. Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main 5 batteries 358 have failed (when their output voltage has fallen below a minimum operational voltage level) the backup batteries 360 provide operating power to power supply 356 which then provides the operating power only to the secondary power bus 364 of camera 110.

Figure 4A:
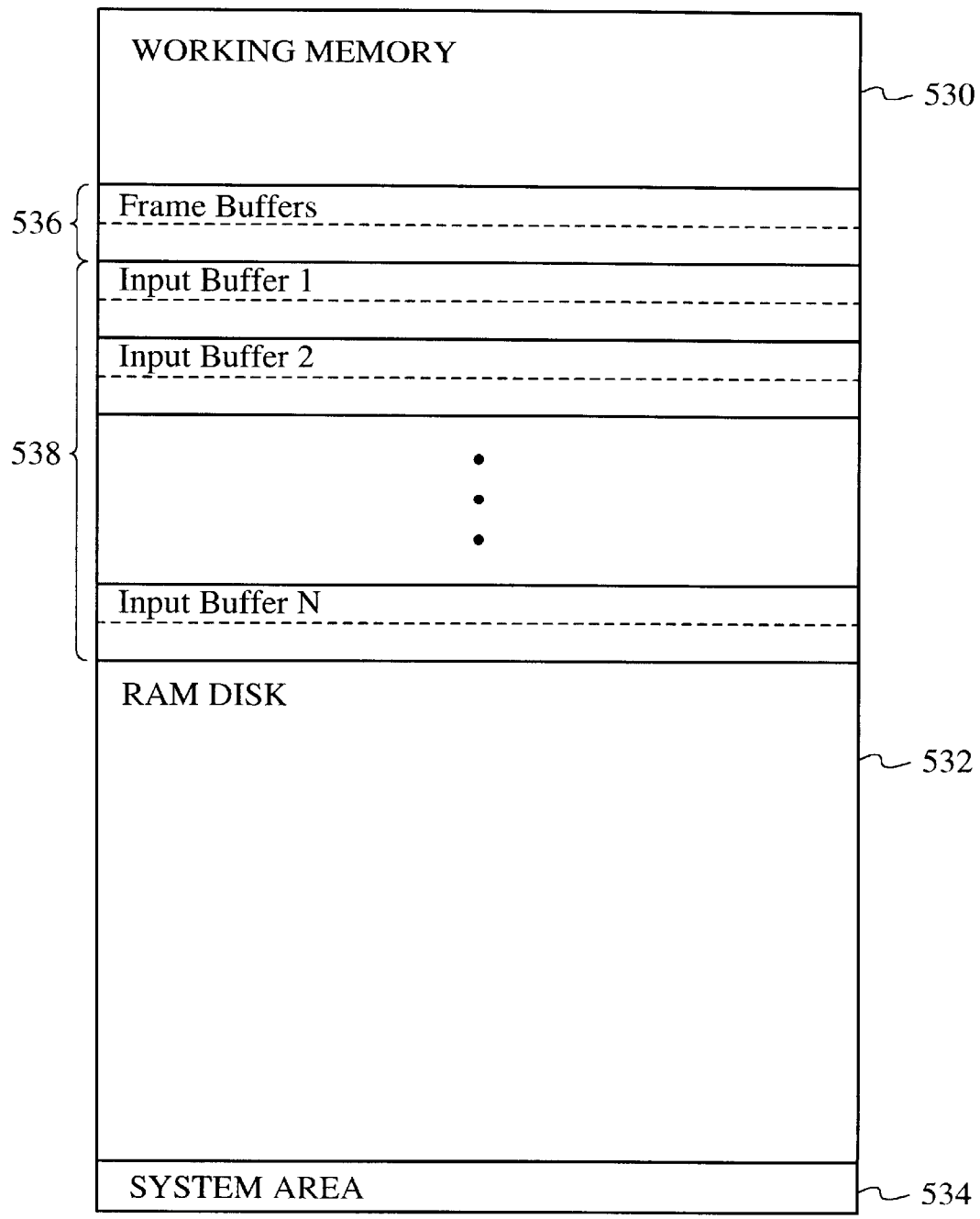
FIG. 4A is a memory map showing the preferred embodiment of the Dynamic Random-Access-Memory (DRAM).

Referring now to FIG. 4A, a memory map showing one embodiment of dynamic random-access-memory (DRAM) 346 is shown. In the preferred embodiment, DRAM 346 includes RAM disk 532, a system area 534, and working memory 530.

RAM disk 532 is a memory area used for storing raw and compressed image data and typically is organized in a "sectored" format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Working memory 530 includes various stacks, data structures and variables used by CPU 344 while executing the software routines used within computer 118. Working memory 530 also includes several input buffers 538 for temporarily storing sets of raw image data received from imaging device 114, and a frame buffer 536 for storing data for display on the LCD screen 402. In a preferred embodiment, each input buffer 538 and the frame buffer 536 are split into two separate buffers, called ping-pong buffers (shown by the dashed lines), to improve the display speed of the digital camera and to prevent the tearing of the image in the display 402.

Figure 4B:
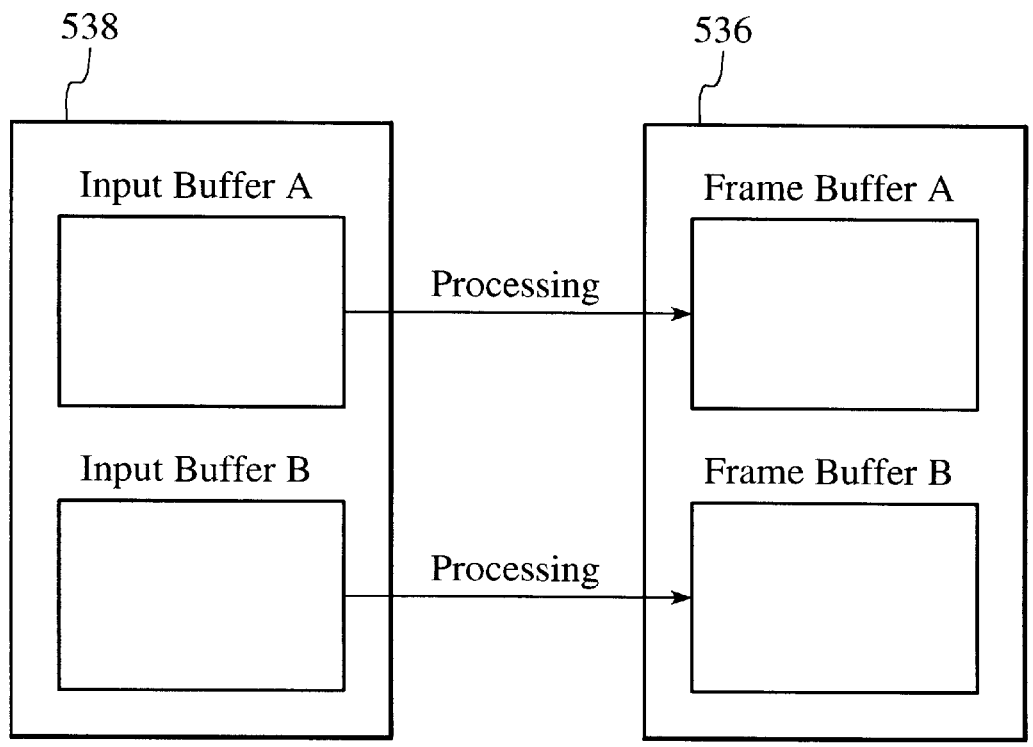
FIG. 4B is a block diagram illustrating the contents of one of the input buffers and the contents of the frame buffer.

Referring now to FIG. 4B, the contents of one of the input buffers 538 and the contents of the frame buffer 536 are illustrated. As shown, each input buffer 538 includes an input buffer A and an input buffer B, and the frame buffer 536 includes a frame buffer A and a frame buffer B. The input buffers A and B alternate between an input cycle and a processing cycle. During the input cycle, the input buffers 538 are filled with raw image data from the image device 114, and during the processing cycle, CPU 344 processes the raw data and transmits the processed data to the frame buffers 536.

Figure 7:
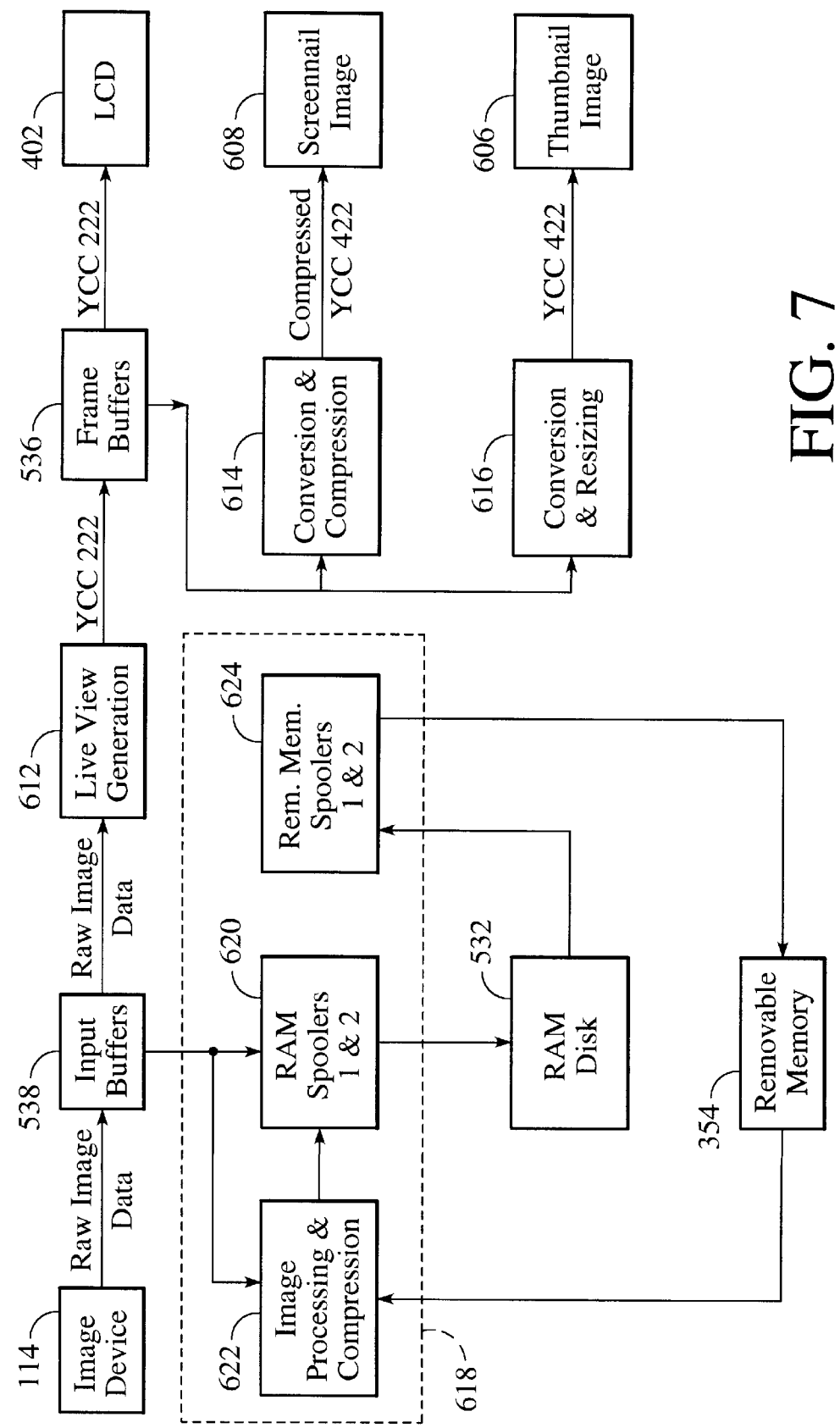
FIG. 7 is a block diagram illustrating the image file generation process, which begins when the camera is in capture mode and the user presses the shutter button to capture an image.

Referring now to FIG. 7, in a preferred embodiment, the processing is performed by a live view generation process 612, which is stored in non-volatile memory 350 and executed on CPU 344. However, the image processing can also be implemented using hardware. During the execution of the live view generation process 612, the CPU 344 takes the raw image data from the input buffers 538, typically in CCD format, and performs color space conversion on the data. The conversion process performs gamma correction and converts the raw CCD data into either a RGB or YCC color format which is compatible with the LCD screen 402. (RGB is an abbreviation for Red, Green, Blue, and YCC is an abbreviation for Luminance, Chrominance-red and Chrominance-blue). After converting the data to YCC, the YCC image data is stored in the frame buffer 536. The LCD controller 390 then transfers the processed image data from the frame buffers to the LCD screen 402 for display.

The resolution of the LCD screen 402 may vary; however, the LCD screen resolution is usually much less than the resolution of the image data that's produced by imaging device 114 when the user captures an image at full resolution. Typically, the resolution of LCD is ¼ the video resolution of a full resolution image. The size of the input buffers 538 may also vary, but in a preferred embodiment, two of the input buffers 538 are required to contain a full resolution image. One input buffer 538 can therefore contain one image captured at ½ resolution. Since the LCD is capable of displaying images at ¼ resolution, the images generated during the live view process are also ¼ resolution and are therefore be stored in one-half, or in one of the ping-pong buffers of an input buffer 538.

Referring again to FIG. 4B, the ping-pong buffers are utilized during live view mode as follows. While input buffer A is filled with image data, the data from input buffer B is processed and transmitted to frame buffer B. At the same time, previously processed data in frame buffer A is output to the LCD screen 402 for display. While input buffer B is filled with image data, the data from input buffer A is processed and transmitted to frame buffer A. At the same time, previously processed data in frame buffer B is output to the LCD screen 402 for display.

FIGS. 5A and 5B are diagrams depicting the preferred hardware components of the camera's 110 user interface 408. FIG. 5A is back view of the camera 110 showing the LCD screen 402, a four-way navigation control button 409, an overlay button 412, a menu button 414, and a set of programmable soft keys 416. FIG. 5B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426a and 426b.

Accordingly, the user interface 408 of the digital camera can be accelerated when accessing captured images through a combination of various features of the present invention. The features include multiple operating modes for the digital camera, the use of multiple thumbnail images for supporting the rapid display of images by eliminating the need to decompress image data in certain operating modes, and speculative decompression of compressed image data for supporting the rapid display of full-sized images in other operating modes. The use of thumbnails and speculative decompression enables the images to be reviewed and navigated more rapidly via representations which can be displayed quickly. Through the present invention the interaction rate and responsiveness to the user is increased significantly over conventional navigation systems.

As stated above, in one aspect of the present invention, the digital camera is provided with several different operating modes for supporting various camera functions. Although the digital camera includes multiple operating mode, the modes relevant to this description are capture (record), review, and play mode. In capture mode, the camera 100 supports the actions of preparing to capture an image, and capturing an image through the use of either the LCD screen 402 alone or the status LCD 406 with the aid of an optional optical viewfinder (not shown). In review mode, the camera 100 supports the actions of reviewing camera contents, editing and sorting images, and printing and transferring images. In play mode, the camera 100 allows the user to view screen-sized images in the LCD screen 402 in the orientation that the image was captured. Play mode also allows the user to hear recorded sound associated to a displayed image, and to play back sequential groupings of images, which may comprise time lapse, slide show, and burst image images. The user preferably switches between the capture, review, and play modes, using the mode dial 420. When the camera is placed into a particular mode, that mode's default screen appears in the LCD screen 402 in which a set of mode-specific items, such as images, icons, and text, are displayed. Through the use of multiple operating modes, the camera functions and features can be categorized, which allows for faster access to those features and functions than would be possible by nesting all the features in one play mode as in conventional digital cameras.

Another aspect of the present invention that allows for the acceleration of the user interface 408 is the use of multiple thumbnails associated with each captured image, which are smaller, reduced-resolution versions of the higher-resolution compressed image data. In a preferred embodiment of the present invention, two types of thumbnail images are associated with each captured image and are included in the image's data file.

Figure 6:
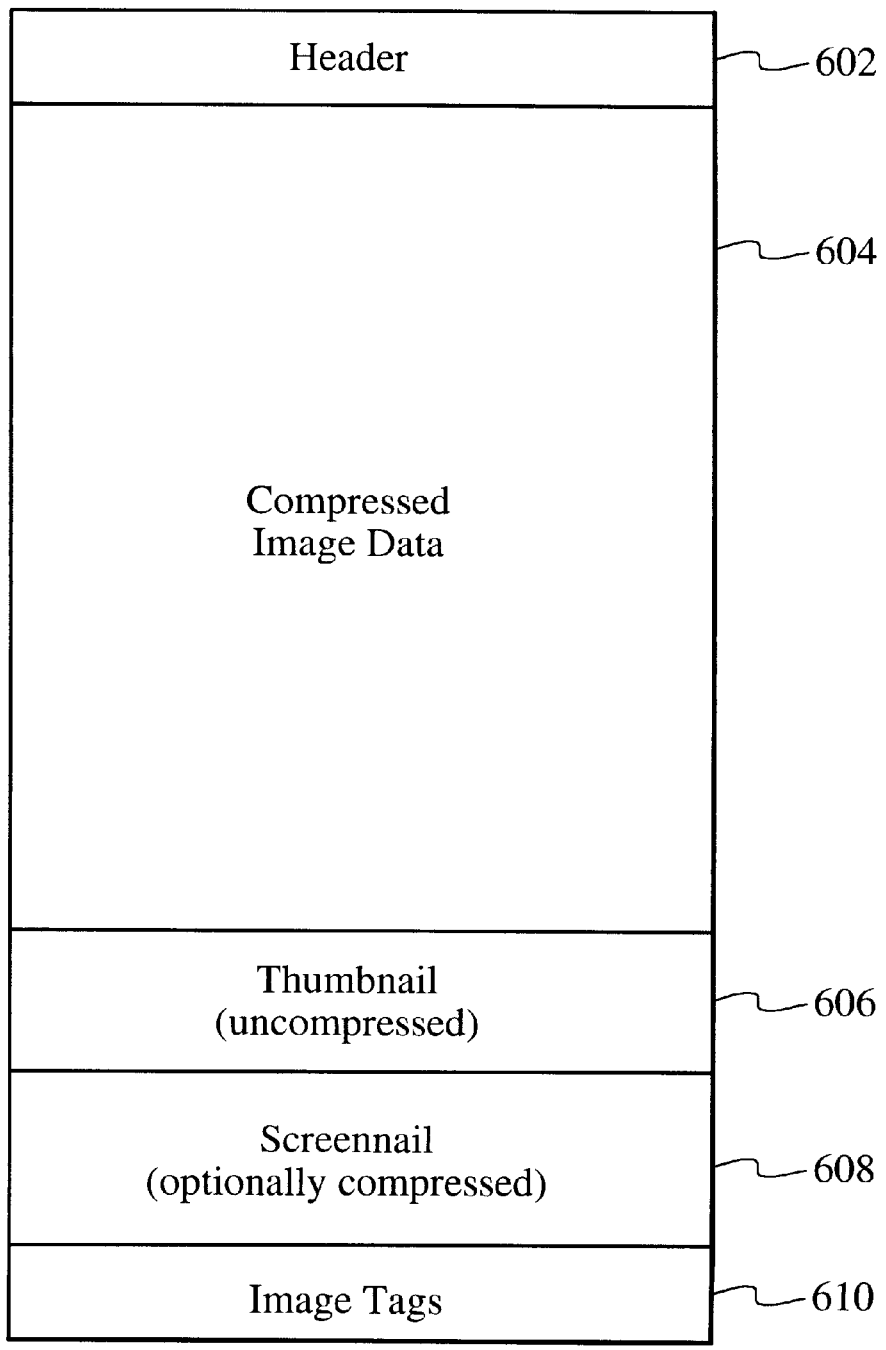
FIG. 6 is a block diagram illustrating an enhanced format of still image file in accordance with the present invention.

Referring now to FIG. 6, a block diagram of an enhanced format of still image file in accordance with the present invention is shown. The image file 600 includes a header 602, compressed image data 604, a thumbnail image 606, a screennail 608, and an image tag field 610. The image file 600 may also include a sound file (not shown) if a sound clip has been attached to the particular image.

The header 602 includes information identifying the particular image file and the image represented by the image data 604. The image data 604 is the actual data comprising the full-sized captured image in compressed form, preferably in JPEG format. Although the user can typically choose the resolution mode in which images are captured, once an image is processed and compressed, the compressed image data 604 is the high-resolution representation of the image compared to the thumbnail 606 and screennail 608. If the image is captured at a resolution of 640×480 pixels, for example, then the compressed image data 604 is typically fifty-to-sixty kilobytes in size.

The thumbnail image 606 is a small, uncompressed low-resolution version of the image. In a preferred embodiment, the pixel size of thumbnail image 606 is less than the display size of the LCD screen 402 (e.g., 80×60 pixels), and has a storage size of approximately ten kilobytes.

The screennail image 608 is a medium-resolution version of the image and in a preferred embodiment is also compressed, although compressing the screennail 608 is optional. Unlike the thumbnail image 606, the screennail image 608 is display-sized and fills the visible area of the LCD screen 402 when displayed. In a preferred embodiment, the pixel size of a compressed screennail image 608 is preferably 288×216 and requires approximately fifteen kilobytes to store.

The image tag field 610 includes information, preferably in the form of tags, regarding the image represented by the image data 604. Media type tags, for instance, indicate all the media types associated with the image, such as whether the image is a single image or a panorama image, for example. In certain operating modes, the media type tags are used to select the type of icon that is displayed in the LCD 402 alongside the thumbnail image 606. Besides media tags, the image tag field 610 may also include other types of tags for storing additional information regarding the image and/or the camera 110 itself. For example, a tag could be used to indicate the settings of the camera 110 at the time the image was captured, or indicate the identity of the camera manufacturer, for instance. The information in these tags may be accessed through the buttons on the camera interface 400. The additional information may then be displayed either as text in the LCD 402.

The enhanced image file 600 of the present invention is created for each image as the user takes pictures while the camera is in capture mode. The enhanced image file 600 is then used to accelerate the user interface of the digital camera in the review and play mode as follows. When the camera is placed into review mode, the thumbnail images 606 contained in the image files 600 are directly displayed on the LCD 402 as representations of captured images, which eliminates the need to process and decompress the compressed image data 604. And when the camera is placed into play mode, the screennail image 608 contained in the image file 600 is first decompressed and displayed on the LCD 402 and then optionally updated with the higher-resolution compressed image data 604 as the image data 604 is being decompressed. This feature enables the digital camera to quickly display a full-sized version of the captured image in the LCD 402 without the delay incurred by first decompressing the higher-resolution JPEG image and resizing it to fit on the LCD 402. Whether or not to decompress and display the compressed image data 604 depends on the resolution of the display and the resolution of the screennail images 608, which is explained further below.

Referring now to FIG. 7, a block diagram is shown of the image file generation process, which begins when the camera is in capture mode and the user presses the shutter button 418 to capture an image. As described above, before the user captures an image in capture mode, frames of raw image data are sequentially captured by the imaging device 114 at a reduced resolution suitable for LCD screen 402, and each of the frames of the raw image data are stored in the ping-pong buffers (FIG. 4B) of an input buffer 538. The live view generation process 612 performs gamma correction and color conversion on the raw image data to convert the data into the YCC format of the LCD screen 402, typically YCC 222 format, and then transfers the YCC 222 data for each frame to the frame buffers 536 for display. The raw image data placed into the input buffers 538 is also processed for extracting exposure, focus, and white balance settings.

Once the user presses the shutter button 418 to capture an image, the raw image data is captured by the image device 114 at a resolution set by the user and the raw image data is stored into an appropriate number of input buffers 538.

The raw image data is then used to generate an enhanced image file 600 for the captured image including the compressed image data 604, the thumbnail 606, and the screennail 608, as shown in FIG. 6.

When generating the thumbnail and screennail images 606 and 608, the present invention takes advantage of the fact that the YCC data in the frame buffers 536 has already been processed by the live view generation process 612 and stored at the reduced resolution of the LCD screen 402. Since the thumbnail and screennail images 606 and 608 are also intended to be lower-resolution representations of the captured image, the previously processed YCC data in the frame buffers 536 is used to generate the thumbnail 606 and screennail 608 directly, rather than using the raw image data stored in the input buffers 538.

To generate the screennail image 608, the YCC data in the frame buffers 536 is converted from YCC 222 format into YCC 422 format and compressed by a conversion and compression process 614. To generate the thumbnail image 606, the YCC data in the frame buffers 536 is converted from the YCC 222 format into YCC 422 format and then resized by a conversion and resizing process 616. During the conversion and resizing process 616, the thumbnail image 606 may be resized by averaging in which a block of pixel values from the YCC 422 data are averaged to represent one pixel value of the thumbnail image 606, and/or by sub-sampling the YCC 422 data in which only a certain number pixels in a block are used to represent one pixel in the thumbnail image 606.

Referring now to FIGS. 4A, 6 and 7, after the thumbnail image 606 and the screennail 608 are generated, they are stored in working memory 530 until the compressed image data 604 is generated. The compressed image data 604 may be generated either before or after the thumbnail and screennail images 606 and 608. However, in a preferred embodiment, the compressed image data 604 is generated after the thumbnail and screennail images 606 and 608 are generated using a background spooling process 618. In an alternative embodiment, the thumbnail image 606 and the screennail 608 may be generated by the background spooling process 618 along with the compressed image data 604.

In another preferred embodiment, the thumbnail image 606 and the screennail 608 may be generated using a two-stage live view generator 612. In the first stage, the live view generator 612 provides images to the frame buffer 536 for display as described above. When the user captures an image, the raw image data from the imaging device is compressed due to higher quality before being stored in the input buffers 538, and the live view generator 612 switches to the second stage. In this stage, the live view generator 612 decompresses the compressed raw image data and processes the data into both YCC 222 data and YCC 422 data. The live view generator 612 may then transfer the YCC 422 data to the frame buffer 536 for display, and generate the thumbnail image 606 and the screennail 608 from the YCC 422 data.

The background spooling process 618 preferably includes RAM spoolers 1 and 2 (620), removable memory spoolers 1 and 2 (624), and an image processing and compression process (IPC) 622. Processes 620, 622 and 624 are preferably implemented as background processes on CPU 344 and may therefore run in parallel with other processes. As used herein, a spooler is a process that transfers data from one process or device to a second process or device. The primary purpose of the background spooling process 618 is to move data out of the input buffers 538 as fast as possible in order to free the input buffers 538 to capture another image. After the data is moved, the data is processed in the background. This allows the next image to be captured before the previous image is processed and compressed, which increases the capture rate of the digital camera.

In operation, after the user has captured an image, control of the raw image data in the input buffers 538 is transferred to RAM spooler 1 (620) if the RAM disk 532 is not full. If the RAM spooler 1 (620) obtains control of the raw image data, then the RAM spooler 1 (620) transfers the raw image data to the RAM disk 532. Alternatively, if the RAM disk 532 is full, then control of the raw image data is transferred to the IPC 622 where the data is processed and compressed to generate the compressed image data 604 (FIG. 6).

In the case where the raw image data has been transferred to the RAM disk 532, the removable memory spooler 1 (624) may then access the raw image data from the RAM disk 532 and transfer it to the removable memory 354. Once the raw image data is transferred to the removable memory 354, the IPC 622 accesses the raw image data and processes the raw image data to generate the compressed image data 604. Alternatively, if the removable memory 354 is full or is not present, then the removable memory spooler 1 (624) may provide the raw image data directly to the IPC 622 for generation of the compressed image data 604.

After the compressed image data 604 is generated, the IPC 622 may provide the compressed image data 604 to the RAM spooler 2 (620). The compressed image data 604 is then combined with the thumbnail 606 and the screennail 608 to generate the enhanced image data file (FIG. 6), and the RAM spooler 2 (620) transfers the compressed image data file 600 to the RAM disk 532. Once the image data file 600 is written to RAM disk 532, the removable memory spooler 2 (624) may then access the image data file 600 and write the image data file 600 onto the removable memory 354. If the removable memory 354 is not inserted, the image data file 600 remains on the RAM disk 532. It should be noted that in an alternative embodiment, the digital camera may be implemented without a RAM disk 532, in which case the image data would be spooled to and from the removable memory 354.

The preferred use of the enhanced image data file 600 of the present invention to accelerate the user interface of the review mode and the play mode of the digital camera are described below.

Figure 8:
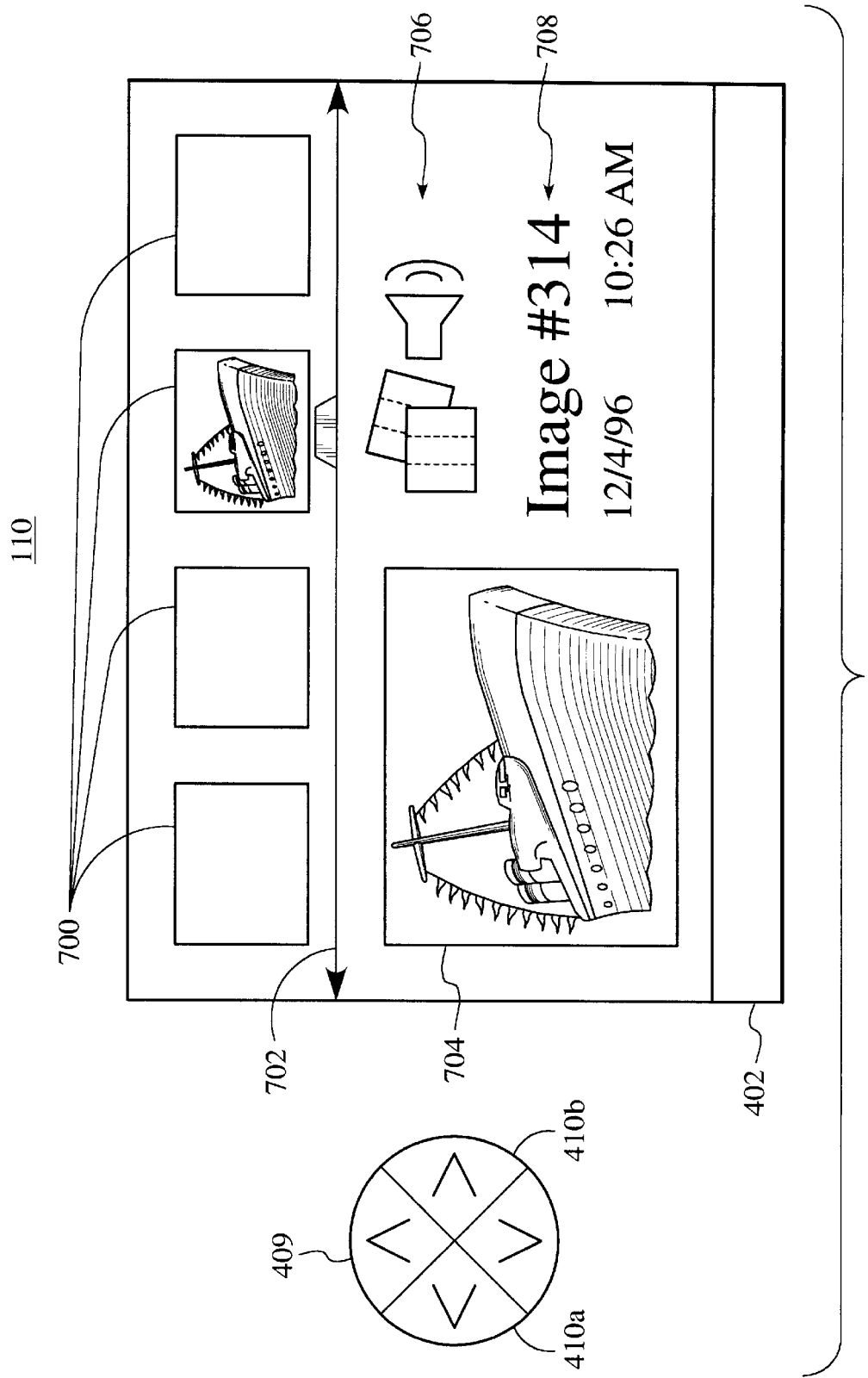
FIG. 8 is a diagram illustrating the operation and appearance of the accelerated user interface during review mode in accordance with a preferred embodiment of the present invention.

Referring now to FIG. 8, a diagram illustrating the operation and appearance of the accelerated user interface during review mode is shown in accordance with a preferred embodiment of the present invention. Moving the mode dial 420 (FIG. 5B) or other such button to access the review mode enables the user to view all the images in the camera along with specific attributes associated with of each of the images. In a preferred embodiment, the review screen layout displays four small thumbnails 700 at a time and is based on a filmstrip metaphor which allows users to quickly move forward and backward among pictures chronologically according to date and time.

The user may navigate through the series of small thumbnails 700 in the LCD screen 402 using the four-way navigation control button 409. When the user depresses or holds down the left/right buttons 410, the small thumbnails 700 are scrolled-off the LCD screen 402 and replaced by new small thumbnails 700 representing other captured images to provide for fast browsing of the camera contents. A stationary selection arrow line 702 is used as both a navigational aid and to indicate which small thumbnail 700 is the currently selected image. As the user presses the navigation buttons 410 and the small thumbnails 700 scroll across the LCD screen 402, the small thumbnail 700 that is positioned over a selection indication in the selection arrow line 702 is considered the currently selected image. In an alternative embodiment, the selection indication is stationary except when positioned near the beginning and the end of the image list.

In a preferred embodiment, when no captured images are available in the camera, the LCD 702 displays a message indicating this to be the case. When only one image is available, then the small thumbnail 700 representing that image is displayed above the selection indication in the selection arrow line 702. And when there are more than four images in the camera, the selection arrow line 702 displays arrow heads to indicate movement in that direction is possible with the left/right navigation buttons 410.

After a small thumbnail 700 becomes the currently selected image, additional information corresponding to that image is automatically displayed in the LCD screen 402. In a preferred embodiment, the additional information includes a resized thumbnail 704 showing a larger view (120×90 pixels) of the currently selected image, and image information comprising an icon bar 706 and text 708. The icon bar may display several icons indicating the media types associated with the active image, such as whether the image is a still, a time lapse, or a burst image, whether sound is attached to the image, and a category for the image. The displayed text 708 may include a specification of the name or number of the image, and the date and time the image was captured.

Figure 9:
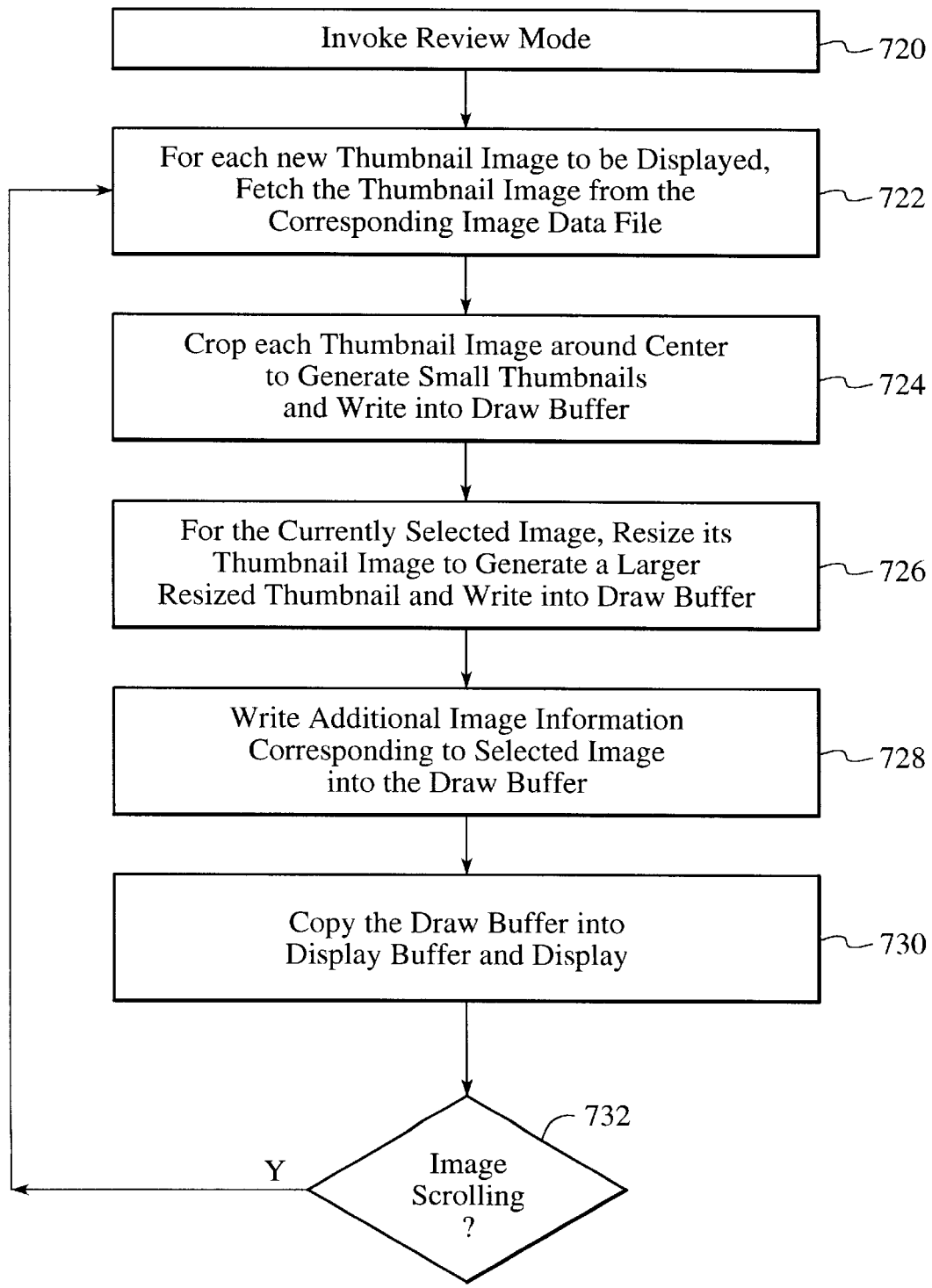
FIG. 9 is a flow chart illustrating the process of accelerating the user interface of the digital camera when in review mode.

Referring now to FIG. 9, a flow chart illustrating the process of accelerating the user interface of the digital camera when in review mode is shown in accordance with the present invention. The process begins once review mode is invoked in step 720. Referring now to FIGS. 3, 6, 8, and 9, after review mode is invoked, each of the thumbnail images 606 to be displayed in the current screen are fetched from the corresponding image data files 600 stored on the removable memory 354 (or a host computer if connected) in step 722.

To further increase the display speed of the user interface, one of the frame buffers 536 shown in FIG. 4B is used as a dedicated draw buffer and the other as a dedicated display buffer in a preferred embodiment of the present invention. When displaying a given review mode screen, all the screen elements are first drawn in the draw buffer and then moved to the display buffer where the data is then output to the LCD 402 for display.

After a thumbnail image 606 is fetched and placed into working memory 530, the thumbnail image 606 is cropped to generate a small thumbnail 700, and the small thumbnail 700 is written into the draw buffer in step 724. In one preferred embodiment, the small thumbnails 700 are generated by cropping the center of thumbnail image 606 to a square size (50×50 pixels) irrespective of image orientation before being displayed. This is done because the small thumbnails 700 are intended to serve as navigational aides rather than accurate representations of their images and the square size reduces the amount of space in the LCD 402 that would be required to support the display of both landscape and portrait thumbnail images. In an alternate embodiment, the thumbnails 700 may be displayed in the LCD 402 in their true orientation and aspect ratio (portrait or landscape). In another embodiment, the thumbnails may also be displayed in landscape format and may be cropped or uncropped to resemble images laid out on a conventional wet film negative.

After all the small thumbnail images 700 are written into the draw buffer, the thumbnail image 606 associated with the currently selected image is resized to generate the larger resized thumbnail 704 and the resized thumbnail 704 is written into the draw buffer in step 726. In a preferred embodiment, the resized thumbnail 704 is generated by multiplying the thumbnail image 606 by a multiplication factor, such as 1.5, which effectively increases the image size by 2.25. Rather than expanding the thumbnail image 606, the resized thumbnail 704 could also be generated by expanding the small thumbnail 700. Since the small thumbnail 700 is cropped to a square size, however, expanding the original thumbnail image 606 provides a better representational view of the selected image as it indicates the true orientation of the image.

After the resized thumbnail 704 is written, additional information regarding to the selected image is written into the draw buffer in step 728. The additional information is displayed by accessing the image tags 610 from the image file 600 corresponding to the selected image. After the draw buffer contains all the necessary screen elements, the contents of the draw buffer are moved to the display buffer and then output to the LCD 402 in step 730.

As the user scrolls through the small thumbnails in the LCD 402 in step 730, then the next thumbnail image 606 to be displayed is fetched from its image data file 600 and placed into working memory 530 as described with reference to step 722 and the process repeats. In one preferred embodiment, if the user holds down the left/right navigation button 410, the resized thumbnail 704 is updated as the selected image changes, and the small thumbnails 700 scroll only as fast as the resized thumbnail 704 can be updated. In another preferred embodiment, the resized thumbnail 704 is not updated with each new selected image, and the small thumbnails 700 rapidly move across the screen at a predefined rate in a smooth scroll, rather than in incremental jumps. In this embodiment, the resized thumbnail 704 is updated once the user releases the left/right navigation button 410 to stop scrolling.

In accordance with the present invention, both small and large thumbnail 700 and 704 are displayed in the review mode using the thumbnail image data 606. Since no JPEG decompression is necessary to display the thumbnails 700 and 704, image display time and responsiveness of the user interface is significantly increased. And since the resized thumbnail 704 is displayed along with the small thumbnails 700, the user can easily identify a given image while maintaining the ability to scroll through the images.

In alternative embodiments, if the speed of the removable media is a hindrance, then the above process could be implemented by caching a set of thumbnail images 606 into working memory. The process could also be implemented without partitioning the frame buffers 536 into a draw and display buffer, and could be implemented instead by swapping ping-pong buffers. However, it is believed the preferred embodiment will result in performance gains because only elements of the screen that change are redrawn in the draw buffer, while the background and other screen elements that remain constant and are not redrawn, which saves time and frees processing cycles for other tasks.

Figure 10:
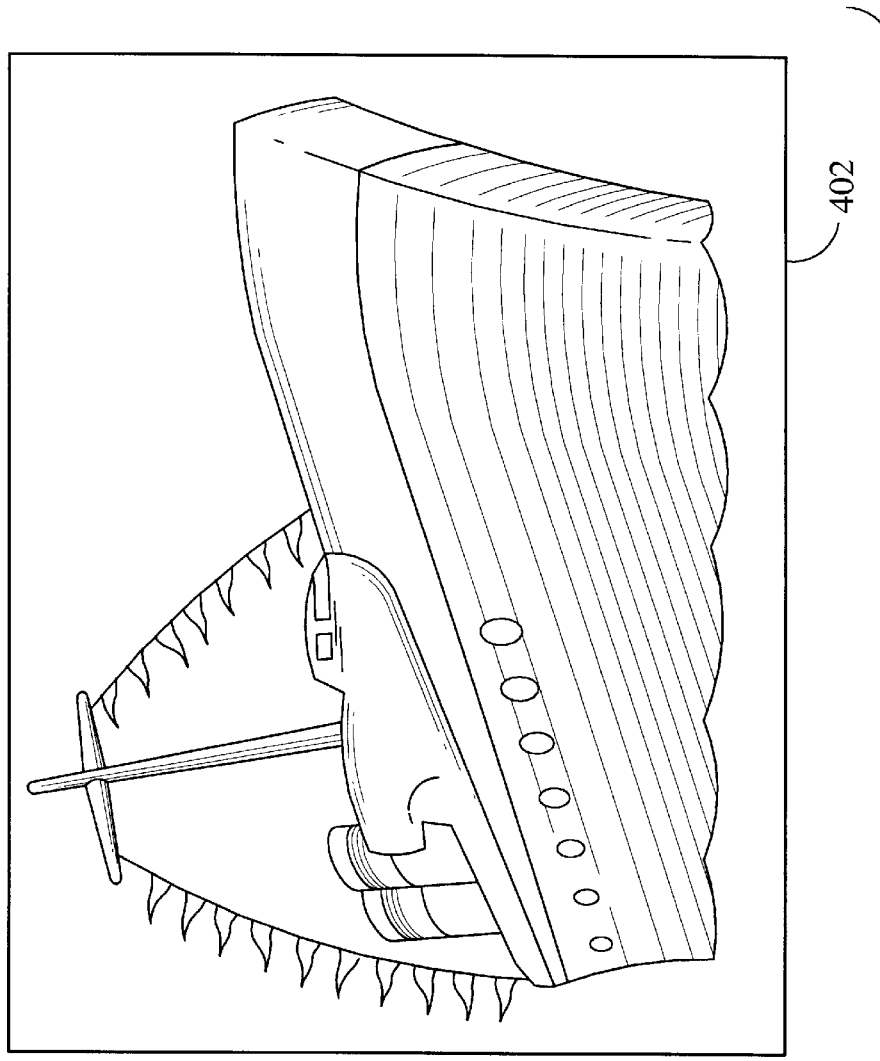
FIG. 10 is a diagram illustrating the operation and appearance of the accelerated user interface during play mode in accordance with a preferred embodiment of the present invention.
Figure 10:
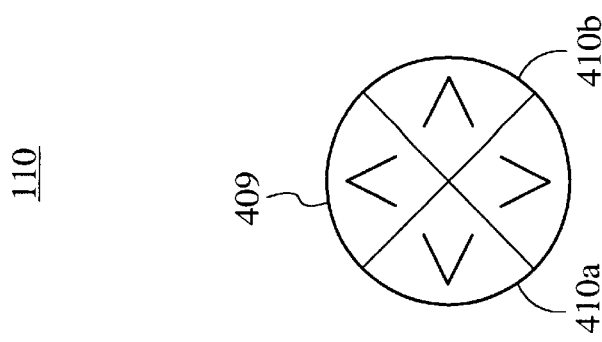

Referring now to FIG. 10, a diagram illustrating the operation and appearance of the accelerated user interface during play mode is shown in accordance with a preferred embodiment of the present invention. Moving the mode dial 420 (FIG. 5B) or other such button to access the play mode enables the user to view full-sized images and to play-back various media types associated with the images. In a preferred embodiment, the play screen layout displays one full-sized image at a time in the orientation that the image was captured. As in the review mode, the user may chronologically navigate through the full-sized images in the LCD screen 402 using the left/right buttons 410 on four-way navigation control button 409. Users can also play back various media types, such as time lapse, bursts and slide show images according to either default or user defined play back rates.

Figure 11A:
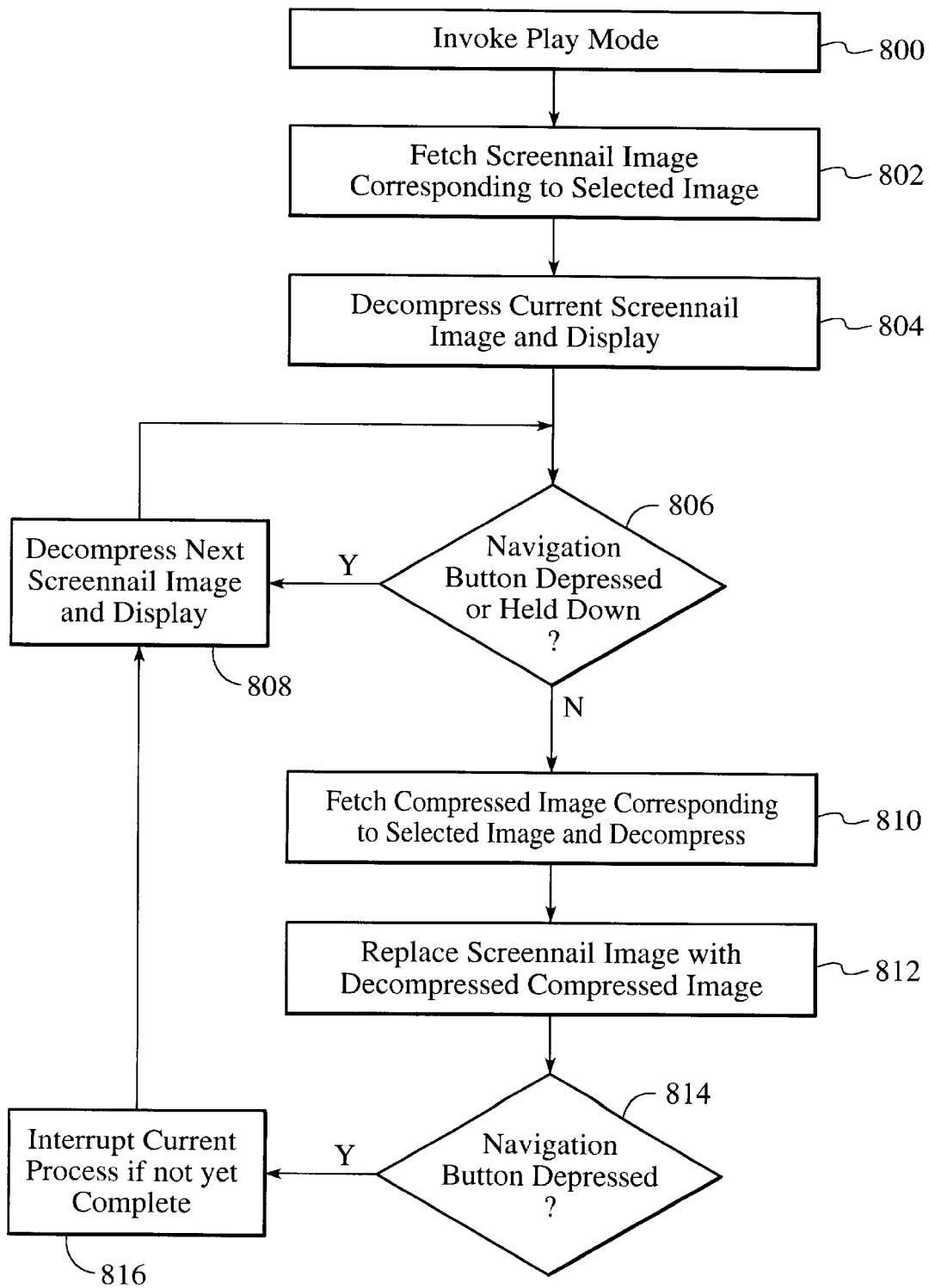
FIG. 11A is a flow chart illustrating the process of accelerating the user interface of the digital camera when in play mode.

Referring now to FIG. 11A a flow chart illustrating the process of accelerating the user interface of the digital camera when in play mode is shown in accordance with the present invention. The process begins once play mode is invoked in step 800. Referring now to FIGS. 3, 6, and 10, after play mode is invoked, the screennail image 608 corresponding to the selected image is fetched from the image data file 600 stored on the removable memory 354 (or a host computer if connected) in step 802. The screennail image 608 is then decompressed and displayed in the LCD screen 402 in step 804.

Figure 11B:
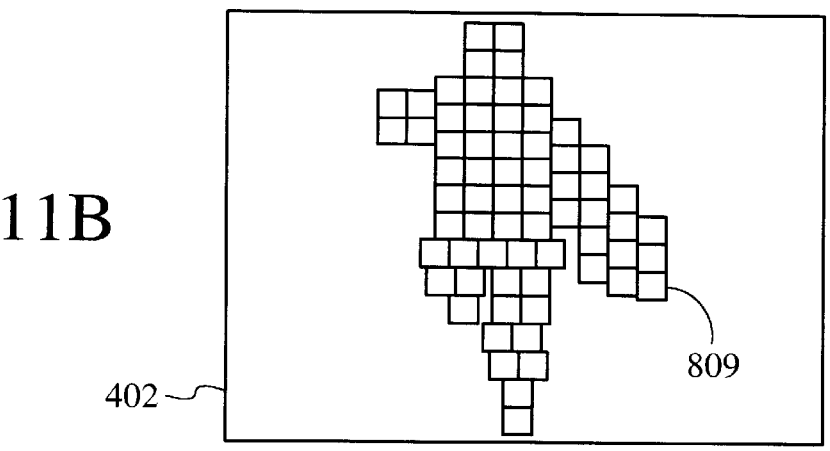
FIGS. 11B, 11C, and 11D illustrate an example of a screennail displayed on an LCD screen and then updated with a higher-resolution image as the higher-resolution image is decompressed in accordance with the present invention.

FIG. 11B illustrates an example of a screennail 809 displayed on the LCD screen 402. Because the screennail 809 is only medium-resolution, the image is not quite clear, but is adequate for a user to tell what image it represents. Referring again to FIG. 11A, if the user presses and holds down the left/right buttons 410 in step 806, then a series of screennail images 608 are continually decompressed and displayed in the LCD screen 402 in step 808 until the user releases the button.

After the button is released, whichever image is currently being displayed becomes the selected image, and the compressed image data 604 corresponding to the selected image is fetched from the image file 600 and decompressed and resized to fit the display in step 810. In a preferred embodiment, as the compressed image 604 is being decompressed, the screennail image 608 in the LCD screen 402 is updated with decompressed image block by block in step 812.

Figure 11C:
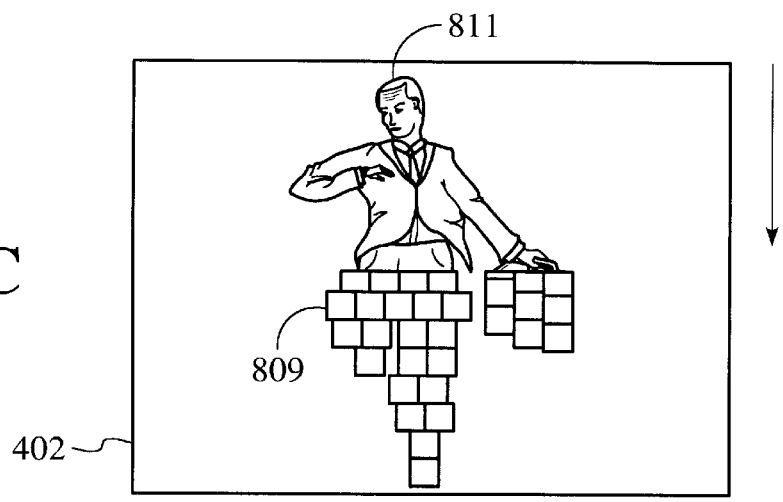
Figure 11D:
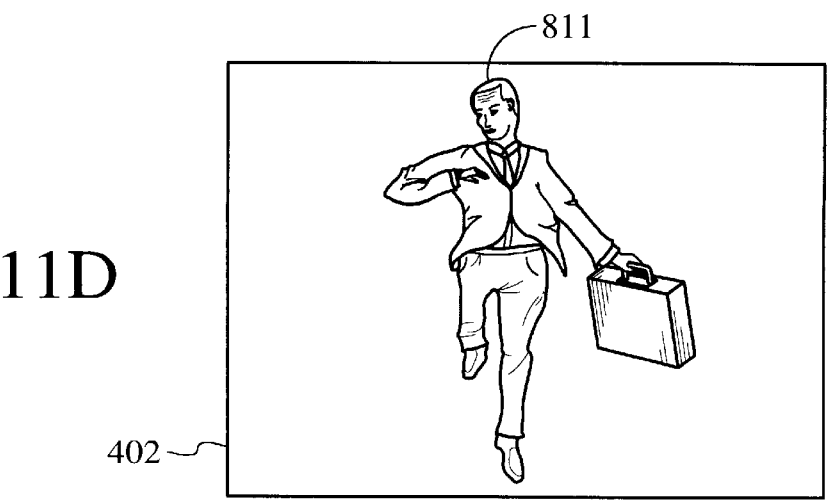

FIGS. 11C and 11D illustrate an example of a higher-resolution compressed image 811 replacing the screennail 809 on the LCD screen 402 from top to bottom as the compressed image 604 is decompressed and resized. In an alternative embodiment, the compressed image 604 may be decompressed and resized in its entirety first and then displayed to replace the screennail image 608 in one step.

In another preferred embodiment of the present invention, the play mode user interface may be further accelerated by optionally displaying the compressed image data 604. That is, if the screennail quality is such that its display on the LCD screen 402 is indistinguishable from the display of the compressed image data 604, then there is no reason to spend the time decompressing and displaying the compressed image data 604. Whether or not to display the compressed image data 604 depends on two factors: the resolution of the screennail image 608, which is determined by the compression factor used to compress the screennail 608, and the resolution of the LCD screen 402. If the resolution of the screennail 608 matches or surpasses the resolution of the LCD screen 402, then only the screennail 608 is displayed in play mode. In this case, the camera can be programmed to monitor whether it is attached to a higher resolution device, such as a PC monitor or television, via the camera's video jack. If so, then the compressed image data 608 is also decompressed and displayed on higher resolution device, as in step 812.

Continuing with the FIG. 11A, if the user presses one of the navigation buttons 410 in step 814, then the decompressing process is interrupted (if not yet complete) in step 816 and the next screennail image 608 is decompressed and displayed in step 808. It should also be understood that the process of decompressing the compressed image is also interrupted if the user changes modes.

Accordingly, by displaying screennail images only when the user holds down a navigation button, the user may scroll through full-sized images more quickly than in conventional digital cameras since decompressing the low resolution screennails is faster than decompressing full-sized compressed images. In addition, since the CPU responds to interrupts caused by position and mode changes, the user may abort the decompression and display of an unwanted compressed image and quickly forward to the next image. That is, since the buttons of the user interface are not frozen while an image is being displayed as in conventional digital cameras, the camera responds to user input immediately and the responsiveness of the digital camera user interface is greatly increased.

In another aspect of the present invention, the compressed screennail image 606 are speculatively decompressed in the review and play modes to further accelerate the user interface of the digital camera. Referring again to FIG. 4A, recall that in the capture mode, the input buffers 538 are used as capture buffers to capture incoming image data. When the camera is placed into review and play modes, however, the input buffers 538 are typically unused. According to the present invention, these unused input buffers 538 are reallocated as working memory 530 when the camera is placed into the review and play modes.

Figure 12:
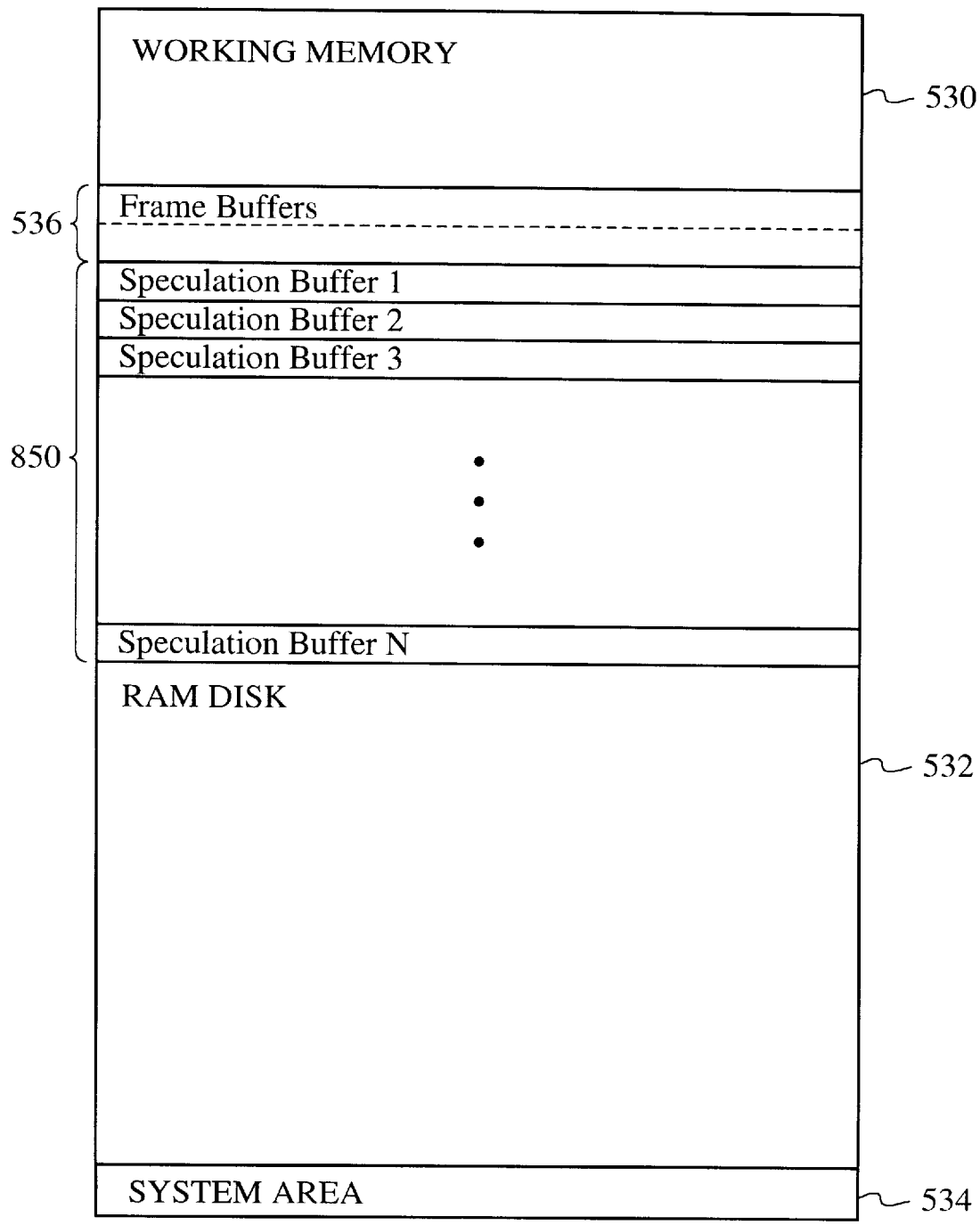
FIG. 12 is a memory map of the DRAM illustrating the reallocation of the input buffers as speculation buffers in accordance with the present invention.

Referring now to FIG. 12, a memory map of the DRAM is shown illustrating the reallocation of the input buffers as speculation buffers in accordance with the present invention. The DRAM 346 is shown as including (N) speculation buffers 850, which are used by a background process to speculatively decompress image data corresponding to images the user may potentially scroll to. By using part of the DRAM 346 as input buffers 358 to capture input data in one mode, and then using that same part of DRAM 346 as speculation buffers 850 to decompress image data in other modes the present invention provides for the multiple use of memory.

During the speculative decompression of the present invention, the speculation buffers 850 are used to decompress screennail images 608 and compressed images 604 in the background during review and play modes. If the user is currently in review mode and switches to play mode, or selects the next image while in play mode, the screennail for the selected image is displayed immediately since it has already been decompressed. As the user begins to scroll from image to image, the screennails that have already been decompressed are similarly displayed. If the user maintains position on the currently selected image long enough, then once all the speculation buffers 850 have been filled with decompressed screennails, the process begins to replace the screennail images in the speculation buffers 850 by decompressing their respective compressed image data 604. This way when the user switches to play mode or selects the next image while in play mode, the higher-resolution image is instantaneously displayed since it has already been decompressed. When this occurs, the step of displaying the screennail is skipped.

Figure 13:
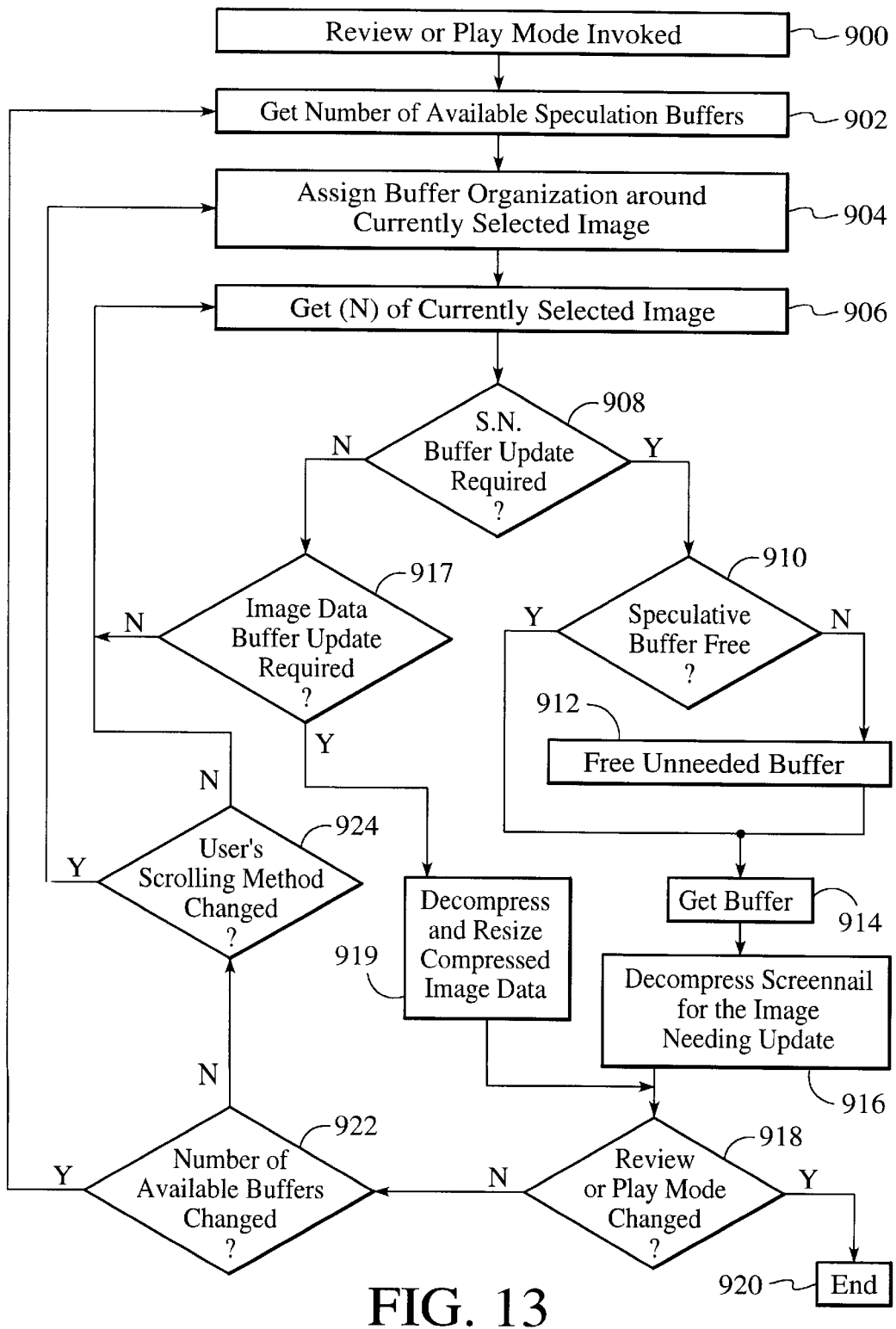
FIG. 13 is flow chart depicting the speculative decompression process in a preferred embodiment of the present invention.

Referring now to FIG. 13, a flow chart depicting the speculative decompression process is shown in a preferred embodiment of the present invention. The process begins when either the review or play modes are invoked in step 900. Once this occurs, it is determined how many speculation buffers 850 are available for use in step 902. Given the number of speculation buffers 850 available, a speculation buffer organization is assigned around the currently selected image based on the scrolling method employed by the user in step 904. For example, the user may automatically advance through the images by holding down the left/right navigation button 410 or by pressing a "play" button in which case the images are advanced at a preset rate. The user may also manually advance through the images by repeatedly pressing either the left or right navigation buttons 410a and 410b. The buffer organization that is assigned in response to the scrolling method predicts which images will be displayed next and determines the order of screennail decompression accordingly.

Figure 14A:
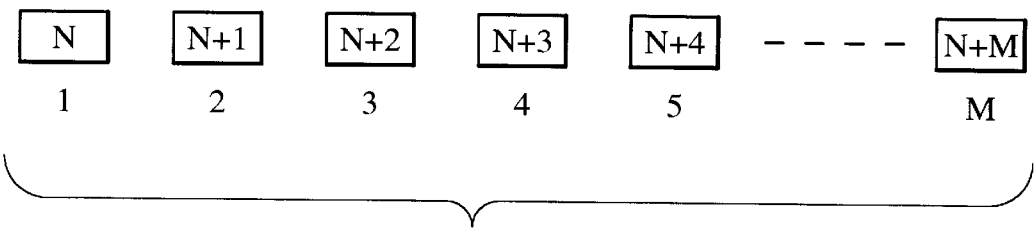
FIGS. 14A and 14B are block diagrams illustrating the buffer organization that is assigned to images in response to automatic and manual scrolling methods, respectively.

Referring now to FIG. 14A, the buffer organization that is assigned to the images in response to an automatic scrolling method is shown. Given M speculation buffers 850, the speculation buffers 850 are assigned such that the currently selected image N in a sequence of images is decompressed first. Thereafter, the order of screennail decompression extends from the selected image N to image N+1, image N+2, image N+3, image N+4, and so on. This order ensures that as the user continues to scroll in the same direction, the screennails 608 for the images ahead of the current image will be decompressed ahead of time and may be displayed without delay when they become the selected image.

Figure 14B:
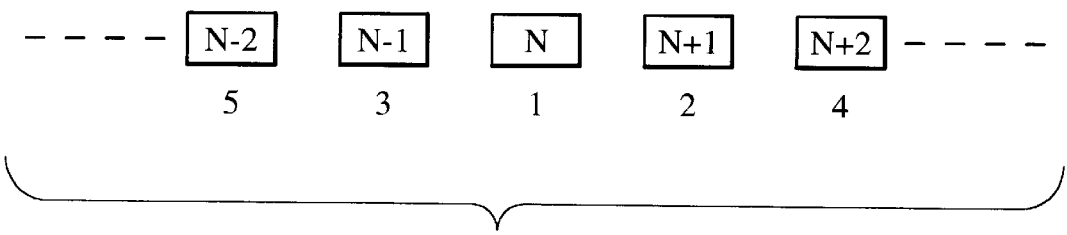

Referring now to FIG. 14B, the buffer organization that is assigned to the images in response to the manual scrolling method is shown. Given M speculation buffers 850 and a currently selected image N in a sequence of images, the speculation buffers 850 are assigned such that the currently selected image N in a sequence of images is decompressed first. Thereafter, the order of screennail 608 decompression alternates around the selected image N as follows: image N+1, image N−1, image N+2, image N−2, and so on. By speculatively decompressing the screennails 608 for the images neighboring the selected image, the screennails 608 may be displayed without delay whether the user advances to the next or the previous image.

Referring again to FIG. 13, after the buffer organization is assigned, the process gets (N), the number of the currently selected image, in step 906. It should be noted that at this point it must be determined whether the selected image is the first or last captured image, since speculative decompression cannot occur beyond the first or last image. If in review mode, then after getting (N) the process must also fetch the screennail 608 for the selected image (N) from the image's image data file 600.

After getting (N) in step 906, it is determined whether a screennail update of any of the speculation buffers 850 is required in nearest neighbor order according to the assigned buffer organization in step 908. If an update is necessary, then the it is determined whether a speculation buffer 850 is free in step 910. If a speculation buffer 850 is not free, then the speculation buffer 850 used to decompress the screennail for the image farthest away from the current image (N) and opposite to the current direction of scrolling is freed in step 912. The freed speculation buffer 850 is then given to the speculation process in step 914 and is used to decompress the screennail 608 for the image that needs updating in step 916.

Referring again to step 908, if after getting (N) it is determined that a screennail update of the speculation buffers 850 is not required, meaning that all speculation buffers contain a decompressed screennail in accordance with the assigned buffer organization, then it is determined whether a compressed image data update of the speculation buffers 850 is required in step 917. In no compressed image data update of the speculation buffers 850 is required, then all the speculation buffers 850 contain decompressed image data and the process waits until the current image (N) changes in step 906. If a compressed image data update of the speculation buffers 850 is required in step 917, the compressed image data for the image needing updating is decompressed and resized in step 919.

After either the screennail or the compressed image data has been decompressed, it is determined whether review or play mode has been terminated in step 918. If so, the speculative decompression process ends in step 920. If the review or play mode has not been terminated, then it is determined whether the number of available speculation buffers 850 has changed in step 922. This could occur for example when a previously used input buffer 538 becomes free and is reallocated as a new speculation buffer 850.

If the number of available speculation buffers 850 has changed, then the process continues by determining how many speculation buffers 850 are available for use in step 902. If the number of available speculation buffers 850 has not changed, then it is determined whether the user 's scrolling method has changed in step 924. If the user's scrolling method has changed, then the process continues by assigning a speculation buffer organization accordingly, as described in step 904. If the user's scrolling method has not changed, then the screennail 608 for the currently selected image is fetched from its image data file 600, as described in step 906 and the process continues.

Figure 15:
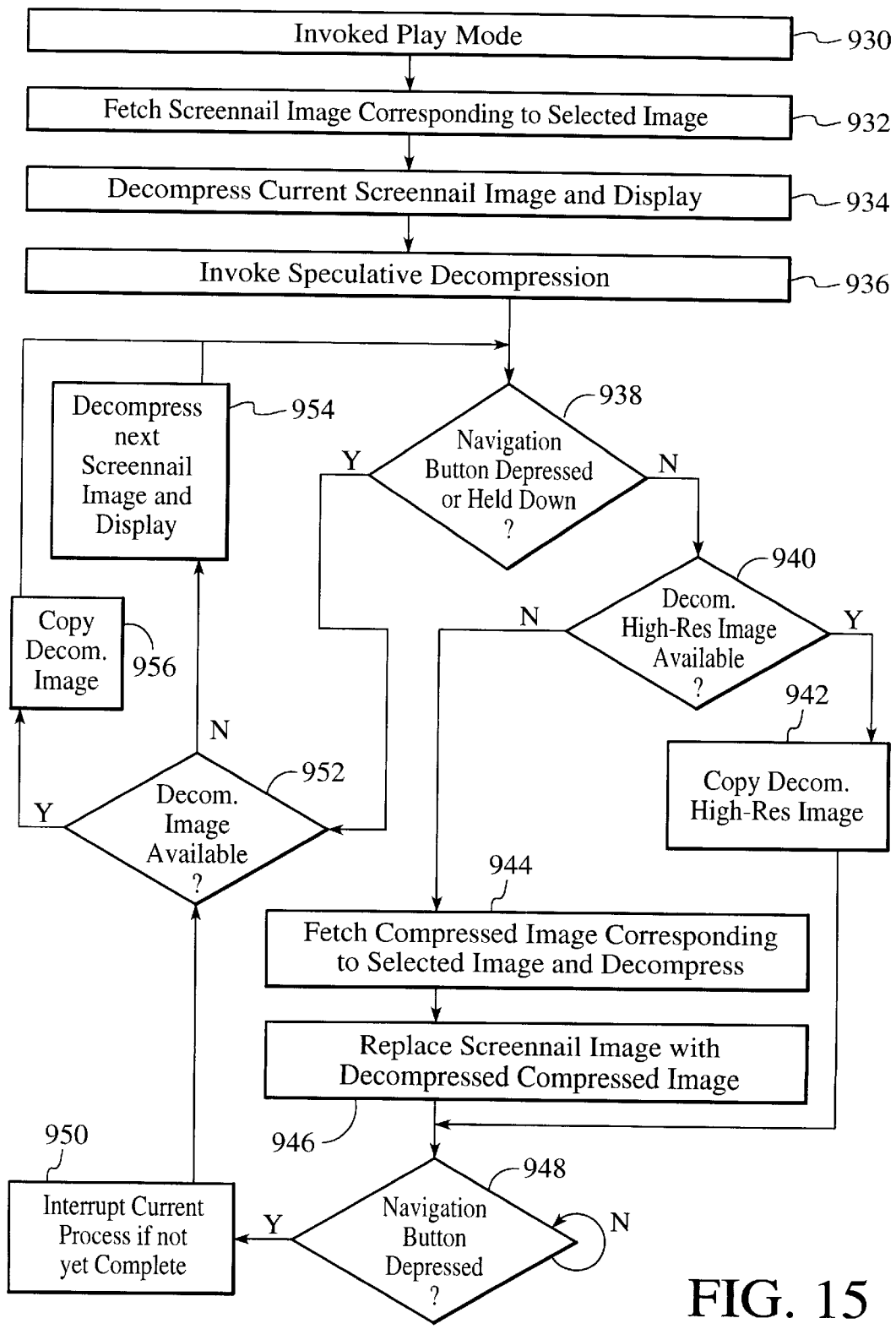
FIG. 15 is a flow chart illustrating the process of accelerating the user interface of play mode using the speculative decompression process.

Referring now to FIG. 15, a flow chart illustrating the process of accelerating the user interface of play mode using the speculative decompression process is shown. As described in FIG. 11A, after play mode is invoked in step 930, the screennail image 608 corresponding to the selected image is fetched in step 932, and decompressed and displayed in step 934. Thereafter the speculation process is invoked in step 936.

If the user presses and holds down the left/right buttons 410 in step 938, then it is determined whether a decompressed screennail or decompressed high-resolution image for the next image is available from the speculation process in step 952. If a decompressed screennail or high-resolution image is available, then it is copied from the speculation buffer 850 to the frame buffer 536 for display in step 956. If a decompressed screennail or high-resolution image is not available in step 952, then the next screennail image 608 is decompressed and displayed in step 954 and the process continues at step 938.

After the navigation button is released in step 938, whichever image is currently being displayed becomes the selected image. It is then determined whether a decompressed high-resolution image is available for the selected image from the speculation process in step 940. If a decompressed high-resolution image is available, then it is copied from the speculation buffer 850 to the frame buffer 536 for display in step 942.

If a decompressed high-resolution image is not available in step 940, then the compressed image data 604 corresponding to the selected image is fetched from the image file 600 and decompressed and resized to fit the display in step 944. In a preferred embodiment, as the compressed image 604 is being decompressed, the screennail image 608 in the LCD screen 402 is updated with decompressed image block by block in step 946. If the user presses one of the navigation buttons 410 in step 948, then the decompressing process is interrupted (if not yet complete) in step 950. It is then determined whether a decompressed screennail or decompressed high-resolution image for the next image is available from the speculation process in step 952, and the process continues.

Accordingly, by speculatively decompressing the screennail images 608, the captured images can be more quickly accessed and reviewed in play mode, thereby facilitating user interaction.

A method and system for accelerating the user interface of an image capture device has been disclosed. Through the present invention, the user interface is accelerated when accessing captured images through interaction of various features. In a first enhancement, as has been described above, an enhance image file is created for each image that contains a combination of a thumbnail, a screennail, and a full resolution compressed image. Through the use of the enhanced image file, the user interface in review mode is accelerated because the thumbnails can be displayed quickly; and the user may easily recognize images by providing a larger resized thumbnail on the display. In a another enhancement of the present invention, the user interface in play mode is accelerated by displaying the reduced resolution screennail image first and then updating it with higher resolution compressed image so that the user can quickly view an image without waiting for the compressed image to be decompressed. In a further enhancement of the present invention, the input buffers are reallocated to allow for the speculative decompression of such images. In so doing, the images can be navigated more rapidly via representations which can be seen quickly. Through the present invention the interaction rate and responsiveness to the user is increased significantly over conventional digital camera navigation systems.

Although the present invention has been described in accordance with the embodiments shown, one of ordinary skill in the art will readily recognize that there could be variations to the embodiments and those variations would be within the spirit and scope of the present invention. For example, the accelerated user interface also applies to cameras having only two modes, but that have multiple navigation screens within the "play mode" Accordingly, many modifications may be made by one of ordinary skill in the art without departing from the spirit and scope of the appended claims.

What is claimed is:

1. A method for accelerating a user interface on a display of an image capture unit, the image capture unit including a plurality of image files for providing a plurality of images, the method comprising the steps of:

selecting an image based upon an automatic scrolling method which advances the selected image at a preset rate:

providing a predetermined number of speculation buffers:

organizing the predetermined number of speculation buffers based upon the selected image by:

assigning the predetermined number of speculation buffers such that the selected image is decompressed in a first speculation buffer; and ordering the remaining speculation buffers such that the images that are in sequential order from the selected image are stored in the remaining speculation buffer dependent upon a user interaction.

2. A method for accelerating a user interface on a display of an image capture unit, the image capture unit including a plurality of image files for providing a plurality of images, the method comprising the steps of:

selecting an image based upon a manual scrolling method which advances the selected image based upon a repeated user action;

providing a predetermined number of speculation buffers;

organizing the predetermined number of speculation buffers based upon the selected image by;

assigning the predetermined number of speculation buffers such that the selected image is decompressed in a first speculation buffer; and ordering the remaining speculation buffers such that the images that are neighboring the selected image are stored in the remaining speculation buffers dependent upon a user interaction.

3. A method for accelerating a user interface on a display of an image capture unit, the image capture unit including a plurality of image files for providing a plurality of images, the image capture unit operating in a plurality of modes; the image capture unit including a plurality of input buffers which are utilized in one of the plurality of modes and are unutilized on at least one of the other of the plurality of modes; the method comprising the steps of:

reallocating the input buffers as speculation buffers by:

assigning the predetermined number of speculation buffers such that the selected image is decompressed in a first speculation buffer; and ordering the remaining speculation buffers such that the images that are neighboring the selected image are stored in the remaining speculation buffers dependent upon a user interaction; and providing image data from the image files to the speculation buffers when the image capture unit is in the at least one of the plurality of modes.

4. The method of claim 3 wherein the plurality of modes comprise capture, play and review modes.

5. The method of claim 4 wherein the plurality of input buffers are unutilized in the review and play modes.

6. A system for accelerating a user interface on a display of an image capture unit, the image capture unit including a plurality of image files for providing a plurality of images, the system comprising:

means for selecting an image by an automatic scrolling method which advances the selected image at a preset rate;

means for providing a predetermined number of speculation buffers;

means for organizing the predetermined number of speculation buffers based upon the selected image;

means for assigning the predetermined number of speculation buffers such that the selected image is decompressed in a first speculation buffer; and means for ordering the remaining speculation buffers such that the images that are in sequential order from the selected image are stored in the remaining speculation buffer dependent upon a user interaction.

7. A system for accelerating a user interface on a display of an image capture unit, the image capture unit including a plurality of image files for providing a plurality of images, the system comprising:

means for selecting an image by a manual scrolling method which advances the selected image based upon a repeated user action;

means for providing a predetermined number of speculation buffers;

means for organizing the predetermined number of speculation buffers based upon the selected image;

means for assigning the predetermined number of speculation buffers such that the selected image is decompressed in a first speculation buffer; and means for ordering the remaining speculation buffers such that the images that are neighboring the selected image are stored in the remaining speculation buffers dependent upon a user interaction.

* * * * *